No. 725,185. PATENTED APR. 14, 1903.
J. WHEAT & W. H. BLACK.
NUT AND BOLT LOCK.
APPLICATION FILED OCT. 10, 1902.
NO MODEL.
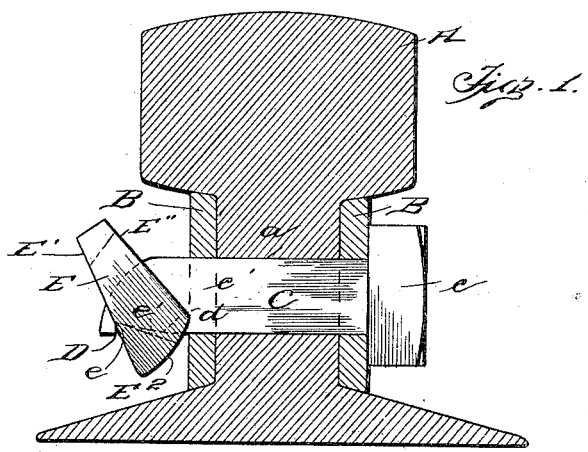
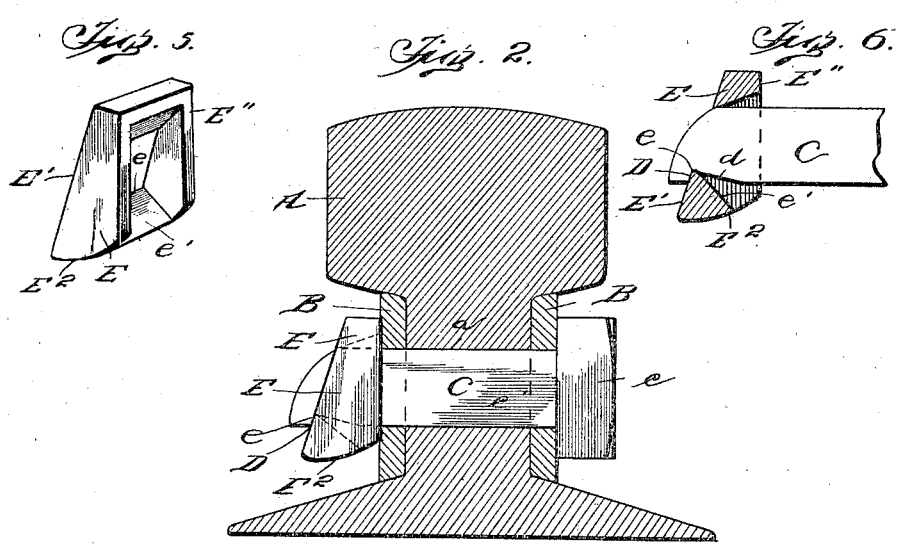
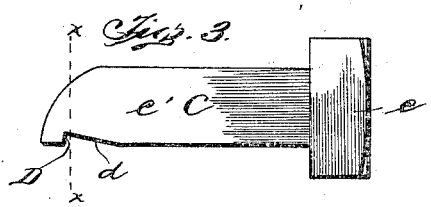
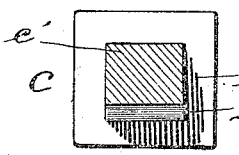
Witnesses:
Inventors:
John Wheat
William H. Black,
by J. S. Bacon
Attorney.

UNITED STATES PATENT OFFICE.

JOHN WHEAT AND WILLIAM H. BLACK, OF DECATUR, ILLINOIS.

NUT AND BOLT LOCK.

SPECIFICATION forming part of Letters Patent No. 725,185, dated April 14, 1903.

Application filed October 10, 1902. Serial No. 126,706. (No model.)

*To all whom it may concern:*

Be it known that we, JOHN WHEAT and WILLIAM H. BLACK, citizens of the United States, residing at Decatur, in the county of Macon and State of Illinois, have invented certain new and useful Improvements in Nut and Bolt Locks, of which the following is a specification, reference being had therein to the accompanying drawings.

This invention relates to an improvement in nut and bolt locks, and has for its primary object the provision of a threadless bolt adapted to coöperate with a threadless nut or locking member in a manner to prevent the separation of the locking member from the bolt when properly applied, whereby accidental withdrawal of the bolt and displacement of the parts secured thereby are prevented.

The invention also contemplates the provision of a peculiarly-fashioned nut or locking member capable of accomplishing the ends stated.

Novel details in the construction and arrangement of the parts will be apparent upon an inspection of the accompanying drawings when read in connection with the detailed description hereinafter.

In the drawings a preferable embodiment of the invention is shown; but it is not the intention to be limited to the exact construction disclosed, except so far as any such limitations are set forth in the appended claim, because slight changes and alterations may obviously be made without in the least departing from the spirit of the invention.

Figure 1 of the drawings is a cross-sectional view of a rail, showing the manner of applying the bolt and lock to secure the fish-plates in place. Fig. 2 is a similar view showing the parts in locked position. Fig. 3 is a side elevation of the bolt removed. Fig. 4 is a sectional view on the line $x\,x$ of Fig. 3, and Figs. 5 and 6 are respectively a perspective and a vertical sectional view of the nut or locking member.

Referring more specifically to the drawings, A designates a railroad-rail of ordinary type, and B the fish-plates at the sides thereof, the rail and fish-plates being provided with alined openings $a$ for the bolts.

C is a bolt provided with an ordinary head $c$ and a stem $c'$. This stem may be of any desired cross-section; but it is preferably angular, as shown in Fig. 4, the openings in the rail and fish-plates being of a similar configuration, whereby the bolt is prevented from turning. The lower end of the stem is provided with a shoulder D, formed by cutting away a portion of the lower side of the bolt, as at $d$, the purpose of which will hereinafter appear.

E is the nut or locking member, which is hollow and opens at both the front and rear thereof. The edge $e$ of the locking member, at the forward lower portion thereof, is arranged to engage beneath the shoulder D of the bolt, as shown in Fig. 1, the inner surface of the locking member being inclined, as at $e'$, to accommodate the cut-away portion $d$ of the bolt. The rear face of the nut or locking member is flat and somewhat shorter than the outer face $E'$ thereof, said inner face being indicated at E, and the lower edges of these surfaces are connected by the bottom $E^2$, curved upwardly and rearwardly. The distance between the point of juncture of the curved bottom and the rear face of the locking member and the edge $e$ of said locking member is slightly greater than the length of the normally projecting portion of the bolt-stem between the face of the fish-plate and the shoulder D. It will thus be seen that the locking member, when applied as illustrated in Fig. 1, will when forced inwardly and downwardly pivot upon the shoulder D and cause its inner face E to engage the face of the fish-plate and lie flush thereagainst. (See Fig. 2.) The relative proportions of the parts are such that as soon as the lower inner edge of the locking member contacts with the fish-plate there will begin a drawing action upon the bolt, and this action will continue until the locking member has been forced into the position when its inner surface will lie flush with the fish-plate, when the strain between the locking member and the bolt will be in a direction longitudinally of the bolt, which will prevent accidental loosening of the locking member, the inner face of the locking member being slightly inclined from its lower to its upper edges to permit the widest operating portion thereof to drop slightly below the lower surface of the bolt to a point beyond a dead-center position.

Having thus described the invention, what is claimed as new, and desired to be secured by Letters Patent, is—

In a nut and bolt lock, the combination with a non-rotatable bolt having a shoulder on its lower face, an apertured locking-nut thickest at its lower portion and having inwardly-diverging upper and lower walls surrounding the aperture therein, the outer edge of the lower wall being arranged to pivot upon said shoulder on the bolt whereby the nut may be forced inwardly until the lower portion thereof is beyond the shouldered surface of the bolt.

In testimony whereof we affix our signatures in presence of two witnesses.

JOHN WHEAT.
WILLIAM H. BLACK.

Witnesses:
J. M. CLOKEY,
FRANK D. MAHAN.